United States Patent [19]

Edo et al.

[11] Patent Number: 5,182,123
[45] Date of Patent: Jan. 26, 1993

[54] COMPOSITE LAMINATED DOUGH

[75] Inventors: Hiroshi Edo; Takashige Bannai; Toshihiro Hayashi; Masayuki Sugie, all of Tokyo, Japan

[73] Assignee: Asahi Denka Kogyo Kabushiki Kaisha, Tokyo, Japan

[21] Appl. No.: 664,840

[22] Filed: Mar. 5, 1991

[30] Foreign Application Priority Data

Mar. 15, 1990 [JP] Japan ................................ 2-65239
Mar. 15, 1990 [JP] Japan ................................ 2-65240
Mar. 15, 1990 [JP] Japan ................................ 2-65241

[51] Int. Cl.$^5$ ............................................ A21D 10/00
[52] U.S. Cl. .................................... 426/19; 426/20; 426/62; 426/94; 426/549; 426/556
[58] Field of Search ................. 426/556, 94, 62, 19, 426/20, 549

[56] References Cited

U.S. PATENT DOCUMENTS 3,585,046  6/1971  Schaible et al. .................. 426/62

FOREIGN PATENT DOCUMENTS 3617547  11/1987  Fed. Rep. of Germany ...... 426/556

OTHER PUBLICATIONS

Samuel A. Matz, Ph.D., Formulas and Processes for Bakers, Pan-Tech. International, Inc., 1987; pp. 40–56.

Primary Examiner—Jeanette Hunter
Assistant Examiner—Mary S. Mims
Attorney, Agent, or Firm—Young & Thompson

[57] ABSTRACT

A composite laminated dough is prepared by superposing at least two different laminated doughs upon each other, each obtained by wrapping a fat in a dough mainly comprising wheat flour and by performing rolling and folding procedures.

3 Claims, No Drawings

COMPOSITE LAMINATED DOUGH

BACKGROUND OF THE INVENTION

1. Field of the Invention

This invention relates to a composite laminated dough to be used for producing confectionery having a laminated structure, such as pies, pastries, crackers and lemon puffs.

2. Description of the Prior Art

There have been known various methods for producing confectionery having a laminated structure represented by pies and pastries.

Examples of these methods include one which comprises wrapping a fat such as butter or margarine in a rolled dough to thereby form a dough/fat/dough structure and folding it in such a manner as to give a multilayered structure; and one which comprises dispersing a fat in the form of particles in a dough to thereby give a structure wherein the fat is wrapped in the dough and then folding it in such a manner as to give a multilayered structure. When baked in an oven, the laminated dough having the alternate structure of dough and fat layers gives a confectionery product having a laminated structure, since the fat layer appropriately suppresses the emission of water vapor (including carbon dioxide when baker's yeast is employed) and thus is puffed up.

With the recent high growth of economy and increase in income level in Japan, eating habits have been changed accompanied by fancy for high-grade and diversified foods. In the field of baking, oven-fresh bakeries, which supply various fresh (as-baked) products including not only conventional white bread, bean-jam buns, jam buns and cream buns but also a number of variety buns, pies, pastries and buns stuffed with prepared foods, enjoy great popularity. The selling points of these oven-fresh bakeries reside in the freshness and variety of the products of which the customers will not tire. Thus it is a serious problem for a manager to characterize (differentiate) his own shop and to secure a production space and manpower while keeping reasonable production cost.

It is difficult under these circumstances to prepare various laminated confectionery products such as pies and pastries the preparation of which requires much labor in, e.g., fat wrapping, rolling and folding. When a butter of an excellent flavor is to be used for producing these products, further, the characteristics of the butter (i.e., a large change in viscosity depending on temperature) cause the splitting of the fat layer and the adhesion of the dough layers to each other, which makes it impossible to form an excellent laminated dough. When a laminated dough is temporarily stored in a frozen stage in order to save labor, the deterioration is furthermore accelerated.

In the case of a laminated dough containing baker's yeast, the activity of the yeast is lowered during the frozen storage, regardless of the use of butter. When such a dough is baked in an oven, no laminated products showing good puffing properties can be obtained.

SUMMARY OF THE INVENTION

Accordingly, the present invention aims at providing a composite laminated dough wherein the above-mentioned disadvantages are improved.

Namely, it is a first object of the present invention to provide a composite laminated dough which facilitates the production of various laminated confectionery products highly diversified in, for example, puffing properties, flavor, color tone, appearance and cost by combining various laminated doughs.

It is a second object of the present invention to provide a composite laminated dough wherein the puffing properties of a laminated dough containing butter are improved.

It is a third object of the present invention to provide a composite laminated dough wherein the puffing properties deteriorated by the decrease in the activity of baker's yeast caused by freezing are restored.

In the present invention, the three objects as recited above have been achieved by providing a composite laminated dough comprising superposing at least two types of laminated doughs upon each other, each of said laminated doughs being obtained by wrapping a fat in a dough mainly comprising wheat flour and by performing rolling and folding procedures (hereinafter referred to as the "first composite laminated dough").

In the present invention, further, the first and second objects as cited above have been achieved by providing a composite laminated dough comprising:

superposing at least two types of wrap-in doughs upon each other, each of said wrap-in doughs being obtained by wrapping a fat in a dough mainly comprising wheat flour, and performing rolling and folding procedures on said superposed doughs (hereinafter referred to as the "second composite laminated dough").

In the present invention, furthermore, the three objects as cited above have been achieved by providing a composite laminated dough comprising:

superposing at least two types of laminated doughs upon each other, each of said laminated doughs being obtained by wrapping a fat in a dough mainly comprising wheat flour and by performing rolling and folding procedures (1), and performing rolling and folding procedures (2) on said superposed doughs (hereinafter referred to as the "third composite laminated dough").

The first, second and third composite laminated doughs according to the present invention enjoy the following advantages (1) and (2). Further, the first and third composite laminated doughs according to the present invention enjoy the additional advantage (3).

(1) Various laminated confectionery products highly diversified in, for example, puffing properties, flavor, color tone, appearance and cost can be easily produced by combining various laminated doughs.

(2) The puffing properties of a laminated dough containing butter can be improved.

(3) The puffing properties deteriorated by a decrease in the activity of baker's yeast caused by freezing can be restored.

DETAILED DESCRIPTION OF THE INVENTION

Now the first, second and third composite laminated doughs of the present invention will be described in detail.

The dough mainly comprising wheat flour to be used in the present invention means those prepared by adding a fat and water optionally together with, for example, egg, milk powder, common salt, sugar, seasonings, baker's yeast and baking powder to wheat flour and kneading the obtained mixture. Examples thereof include pie dough, pastry dough, bread dough and croissant dough.

The size and shape of the above-mentioned dough mainly comprising wheat flour are not particularly restricted, as long as a fat can be wrapped therein. The wrapping manner is not particularly restricted. For example, a fat in the form of a sheet may be wrapped in the above-mentioned dough in the form of a bag. Alternatively, a fat in the form of particles of a mass may be dispersed in the above-mentioned dough.

As the fat to be wrapped in the above-mentioned dough mainly comprising wheat flour in the present invention, either an emulsified one or an unemulsified one may be used, as long as it is edible. Examples thereof include natural plastic fats such as butter, plasticized fats such as margarine, plastic shortening and reverse-phase margarine and various animal and vegetable fats.

The form of the fat to be used is not particularly restricted, as long as it can be wrapped in the above-mentioned dough. In general, it may be molded into a sheet, cubes or particles.

Said fat may be used in an amount ranging from 20 to 60 parts by weight, preferably from 30 to 50 parts by weight, per 100 parts by weight of the dough. When the fat content is smaller than 20 parts by weight, no satisfactory puffing properties can be achieved and the obtained laminated product shows poor lifting. When it exceeds 60 parts by weight, on the other hand, the workability in the preparation of the dough is deteriorated and the obtained product shows an oily texture and suffers from serious oil-off.

The first composite laminated dough of the present invention can be obtained by wrapping the fat with the dough mainly comprising wheat flour and then performing the rolling and folding procedures to thereby prepare laminated doughs of at least two types and then superposing these laminated doughs upon each other.

The second composite laminated dough of the present invention can be obtained by wrapping the fat with the dough mainly comprising wheat flour to thereby prepare at least two types of wrap-in doughs, superposing these wrap-in doughs upon each other and then performing the rolling and folding procedures.

The third composite laminated dough of the present invention can be obtained by wrapping the fat with the dough mainly comprising wheat flour, performing the rolling and folding procedures (1) to thereby prepare laminated doughs of at least two types, superposing these laminated doughs upon each other and then further performing the rolling and folding procedures (2).

In the first and third composite laminated doughs, the combination of the above-described laminated doughs of at least two types may be arbitrarily selected depending on the purpose and usage, as long as it involves two or more laminated doughs of two or more types. Examples of said combination include those comprising laminated doughs differing in types from each other (e.g., pie dough/pastry dough or pie dough/bread dough), those comprising at least two pie doughs differing in composition from each other, those comprising at least two bread doughs differing in composition from each other, and those comprising laminated doughs different in the fat wrapped therein from each other. Among these combinations, those comprising at least two laminated doughs substantially differing from each other in extensibility of the fat wrapped therein, those comprising laminated doughs differing from each other in the puffing properties of the fat wrapped therein and those comprising laminated doughs differing from each other in color tone are preferable. Further, a combination comprising a laminated dough containing baker's yeast and a baker's yeast-free laminated dough is preferable.

As the combination of the wrap-in doughs of at least two types in the second composite laminated dough of the present invention, it is preferable to combine wrap-in doughs together in the same manner as the one described above regarding the laminated doughs of the first and third composite laminated dough.

The fats substantially differing from each other in extensibility mean those which are different from each other in the degree of extension of a fat layer in the wrapping-in or rolling and folding procedures and show a significant difference in puffing properties. Examples of such a combination of at least two fats include a combination comprising a plastic fat of a highly excellent extensibility (e.g., margarine to be exclusively used for pie) with butter or a common plastic fat and one comprising a common plastic fat with a nonplastic fat. Among them, a combination of butter with margarine to be exclusively used for roll-in is preferable. The margarine to be exclusively used for roll-in is a marketed one, which is produced exclusively for doughs prepared through a roll-in procedure, is excellent in extensibility and viscoelasticity, and can withstand the rolling and folding procedures.

When a laminated dough containing butter is to be superposed upon a laminated dough containing the margarine to be exclusively used for roll-in in the first and third composite laminated doughs, the laminated dough containing butter may be inserted between layers of the laminated dough containing the margarine to be exclusively used for roll-in. Thus a laminated confectionery product excellent in puffing properties and flavor can be obtained.

As an example of the above-mentioned combination comprising fats differing in puffing properties from each other, a combination of the margarine to be exclusively used for roll-in with common margarine may be cited. When such laminated doughs are to be superposed upon each other, the laminated dough containing common margarine may be inserted between layers of the laminated dough containing margarine to be exclusively used for roll-in. Thus a characteristic laminated confectionery product can be obtained.

The above-mentioned laminated doughs differing in color tone from each other mean laminated doughs prepared by adding various coloring components or colorants to fats or doughs. When these laminated doughs are superposed upon each other, the laminated confectionery product may be molded in such a manner that the cross section of the laminated structure serves as the surface of the product. Thus a laminated confectionery product of a characteristic appearance can be obtained.

When a laminated dough containing baker's yeast is combined with a baker's yeast-free one, as described above, a composite laminated dough of an excellent flavor can be obtained.

In the case of the first composite laminated dough of the present invention, the rolling and folding procedures for preparing the composite laminated doughs may be conducted with the use of, for example, a rolling pin or a machine such as a reverse sheeter. It is preferable to form a laminated dough consisting of from 48 to 256 layers.

After superposing the laminated doughs, the rolling may be performed, if required. This procedure may be effected with the use of a rolling pin. Alternatively, a machine such as a reverse sheeter may be used therefor. The degree of the rolling may be controlled depending on the laminated confectionery product to be produced.

In the case of the third composite laminated dough of the present invention, the rolling and folding procedures (1) for producing the laminated doughs may be performed by using a rolling pin or a machine such as a reverse sheeter. It is preferable that each of the obtained laminated doughs consist of 12 to 64 layers.

The rolling and folding procedures (2) following the superposing of the laminated doughs upon each other may be performed in the same manner as the one employed in the procedures (1). It is preferable that the composite laminated dough thus obtained consists of 48 to 256 layers.

When a wrap-in dough enclosing butter is to be superposed onto another wrap-in dough enclosing margarine to be exclusively used for roll-in in the preparation of the second composite laminated dough of the present invention, the former dough may be inserted between layers of the latter dough. Thus a laminated confectionery product excellent in puffing properties and flavor may be obtained.

As an example of the above-mentioned combination of fats differing in puffing properties from each other, one comprising margarine to be exclusively used for roll-in with common margarine may be cited. When such wrap-in doughs are to be superposed upon each other, the wrap-in dough enclosing the common margarine may be inserted between layers of the wrap-in dough enclosing the margarine to be exclusively used for roll-in. Thus a characteristic laminated confectionery product may be obtained.

The above-mentioned wrap-in doughs differing in color tone from each other mean laminated doughs prepared by adding various coloring components or colorants to fats or doughs. When these wrap-in doughs are superposed upon each other, the laminated confectionery product may be molded in such a manner that the cross section of the laminated structure serves as the surface of the product. Thus a laminated confectionery product of a characteristic appearance can be obtained.

In the present invention, the rolling and folding procedures may be performed by using a rolling pin or a machine such as a reverse sheeter. It is preferable that the composite laminated dough thus obtained consists of 48 to 256 layers.

The first, second and third composite laminated doughs of the present invention may be baked as such. Alternately, they may be temporarily frozen and then thawed and baked. Thus laminated confectionery products can be obtained.

The freezing procedure may be performed after the completion of the superposing of the laminated doughs by using an apparatus and means commonly employed in freezing foods.

EXAMPLE

To further illustrate the present invention, the following Examples and Comparative Examples will be given.

EXAMPLE 1

A pie comprising the composite laminated dough of the present invention was produced with the use of the compositions as specified below in the following manner.

Composition (g)

|  | 1 | 2 |
|---|---|---|
| Dough |  |  |
| hard flour | 500 | 500 |
| soft flour | 500 | 500 |
| egg (net) | 100 | 100 |
| common salt | 10 | 10 |
| shortening | 50 | 50 |
| water | 480 | 480 |
| Fat for folding |  |  |
| margarine (to be exclusively used for roll-in) | 900 |  |
| butter |  | 900 |

Production Process (1) In accordance with the composition 1, wheat flours were fed into a mixer.

(2) Cold water (at approximately 5° C.), egg and common salt were homogeneously mixed together and added to (1). The resulting mixture was mixed by stirring at a low speed for 2 minutes and then at a moderate speed for 4 to 5 minutes.

(3) After adding shortening, the mixture was mixed by stirring at a low speed for 2 minutes, at a moderate speed for 3 minutes, and then at a high speed for 1 minute. Kneading temperature: 20±1° C.

(4) The dough was introduced into a retarder (2° C.) for resting therein for approximately 1 hour.

(5) The fat was wrapped with the dough.

(6) The dough was folded in four twice to thereby give a dough consisting of 16 layers.

(7) The dough was introduced into a retarder for resting.

(8) The dough was folded in four once and rolled until the thickness became 10 mm. Thus a laminated dough containing margarine and consisting of 64 layers was obtained.

(9) In accordance with the composition 2, a laminated dough containing butter was prepared through the same procedures as the above-mentioned ones (1) to (8).

(10) The laminated dough containing butter (Composition 2) obtained in the above (9) was superposed upon the laminated dough containing margarine (Composition 1) obtained in the above (8) in such a manner that the former was inserted between the latter (thickness: approximately 30 mm). Next, the laminated dough was rolled until the thickness became 10 mm and cut into pieces (100 mm in length, 10 mm in width). The obtained pieces were placed on a baking sheet in such a manner that the cross section of each piece was located upside.

(11) After baking at 200° C. for 12 minutes, a pie was obtained. This pie showed a lifting of 50 mm (the average of 10 pieces) and was well-baked. It had a light texture and a butter-rich flavor.

The laminated dough containing margarine of the composition 1, wherein the margarine to be exclusively used for roll-in excellent in extensibility and viscoelasticity is used, gives continuous fat layers in the pie dough and shows good puffing properties. On the other hand, the laminated dough containing butter of the composition 2 gives discontinuous fat layers and shows poor puffing properties, since the butter has a poor extensibility and a narrow range of viscoelasticity temperature and thus the hardness of the dough does not agree with that of the dough during rolling after resting.

The composite laminated dough of the present invention comprising the laminated doughs of the compositions 1 and 2 superposed upon each other can give a pie which is well baked and has a light texture and a butter-rich flavor.

Such a pie can be obtained neither by merely mixing the above-mentioned two fats nor by preliminarily blending them.

COMPARATIVE EXAMPLE 1

A pie was produced by using the composition as specified below in the following manner.

Composition

The same as the composition 2 specified Example 1.

Production process (1) In accordance with the above-mentioned composition, laminated doughs containing butter (64 layers, thickness: 10 mm) were prepared by the same procedures as the ones (1) to (8) described in Example 1.

(2) Three laminated doughs containing butter obtained in the above (1) were superposed upon each other (thickness: approximately 30 mm) and then rolled until the thickness was reduced to 10 mm. Then the dough was cut into pieces (100 mm in length, 10 mm in width). The obtained pieces were placed on a baking sheet in such a manner that the cross section of each piece was located upside.

(3) After baking at 200° C. for 12 minutes, a pie was obtained. This pie showed a lifting of 40 mm (the average of 10 pieces) and was not well-baked. It had a butter-rich flavor but a heavy texture.

EXAMPLE 2

A pie comprising the composite laminated dough of the present invention was produced with the use of the compositions as specified below in the following manner.

Composition

|  | 1 | 2 |
| --- | --- | --- |
| Dough |  |  |
| hard flour | 500 | 500 |
| soft flour | 500 | 500 |
| egg (net) | 100 | 100 |
| common salt | 10 | 10 |
| shortening | 50 | 50 |
| water | 480 | 480 |
| Fat for folding |  |  |
| margarine (to be exclusively used for roll-in) | 900 |  |
| common margarine |  | 900 |

Production Process (1) In accordance with the composition 1, wheat flours were fed into a mixer.

(2) Cold water (at approximately 5° C.), egg and common salt were homogeneously mixed together and added to (1). The resulting mixture was mixed by stirring at a low speed for 2 minutes and then at a moderate speed for 4 to 5 minutes.

(3) After adding shortening, the mixture was mixed by stirring at a low speed for 2 minutes, at a moderate speed for 3 minutes and then at a high speed for 1 minute. Kneading temperature: 20±1° C.

(4) The dough was introduced into a retarder (2° C.) for resting therein for approximately 1 hour.

(5) After wrapping the fat, the dough was rolled until the thickness was reduced to 20 mm. Thus a wrap-in dough containing the margarine to be exclusively used for roll-in was obtained.

(6) In accordance with the composition 2, a wrap-in dough containing the common margarine was prepared by the same procedures as the above-mentioned ones (1) to (5).

(7) The wrap-in doughs obtained in the above (5) and (6) were superposed upon each other and rolled. After folding in four twice, a dough consisting of 32 layers was obtained.

(8) The dough was introduced into a retarder for resting.

(9) After folding in four once, the dough was rolled until the thickness was reduced to 10 mm and then cut into pieces (100 mm in length, 10 mm in width). These pieces were placed on a baking sheet in such a manner that the cross section of each piece was located upside.

(10) After baking at 200° C. for 12 minutes, a pie was obtained.

This pie had a layered structure of alternating continuous and discontinuous layers. The baked product showed a lifting of 45 mm (the average of 10 pieces) and was characterized by a flaky and less brittle texture.

The wrap-in dough containing margarine of the composition 1, wherein the margarine to be exclusively used for roll-in excellent in extensibility and viscoelasticity is used, gives continuous fat layers in the pie dough and shows good puffing properties. On the other hand, the wrap-in dough containing the common margarine of the composition 2 gives discontinuous fat layers and forms a structure similar to that of a kneaded pie, since the common margarine used therein has no such properties as being suitable for the roll-in technique including cooling, plasticizing and controlling of crystallization and thus cannot give any appropriate extensibility or viscoelasticity during the production of the pie.

The composite laminated dough of the present invention obtained by superposing the laminated doughs of the compositions 1 and 2 upon each other and performing rolling and folding procedures can give a pie which has a structure of alternating continuous and discontinuous layers and a flaky and less brittle texture. When baked, a pie shows puffing (lifting). In the case of a pie of a single-layer structure, a higher lifting is the more desirable. In the case of a pie comprising layers differing from each other, however, the preference of the structure cannot be always evaluated depending exclusively on lifting.

Such a pie can be obtained neither by mixing the two above-mentioned margarine nor by preliminarily blending them.

COMPARATIVE EXAMPLE 2

A pie was produced by using the composition as specified below in the following manner.

Composition

The same as the composition 2 specified in Example 2.

Production Process (1) In accordance with the above-mentioned composition, the fat was wrapped with the dough by the same procedures as the ones (1) to (5) described in Example 2. After rolling in such a manner as to give a thickness of 20 mm, a wrap-in dough containing the margarine to be exclusively used for roll-in was obtained.

(2) This dough was folded in two and then in four twice. Thus a dough consisting of 32 layers was obtained.

(3) The dough was baked in the same manner as the one described in Example 1.

This pie had a layered structure exclusively comprising continuous layers and showed a lifting of 50 mm (the average of 10 pieces) after baking. It had a flaky and brittle texture.

EXAMPLE 3

A pie comprising the composite laminated dough of the present invention was produced with the use of the compositions as specified below in the following manner.

Composition (g)

|  | 1 | 2 |
| --- | --- | --- |
| Dough |  |  |
| hard flour | 500 | 500 |
| soft flour | 500 | 500 |
| egg (net) | 100 | 100 |
| common salt | 10 | 10 |
| shortening | 50 | 50 |
| water | 480 | 480 |
| Fat for folding |  |  |
| margarine (to be exclusively used for roll-in) | 900 |  |
| butter |  | 900 |

Production Process (1) In accordance with the composition 1, wheat flours were fed into a mixer.

(2) Cold water (at approximately 5° C.), egg and common salt were homogeneously mixed together and added to (1). The resulting mixture was mixed by stirring at a low speed for 2 minutes and then at a moderate speed for 4 to 5 minutes.

(3) After adding shortening, the mixture was mixed by stirring at a low speed for 2 minutes, at a moderate speed for 3 minutes and then at a high speed for 1 minute. Kneading temperature: 20±1° C.

(4) The dough was introduced into a retarder (2° C.) for resting therein for approximately 1 hour.

(5) The fat was wrapped with the dough.

(6) The dough was folded in four twice to thereby give a dough consisting of 16 layers.

(7) The dough was introduced into a retarder for resting. Thus a laminated dough containing margarine was obtained.

(8) In accordance with the composition 2, a laminated dough containing butter was prepared through the same procedures as the above-mentioned ones (1) to (7).

(9) The laminated dough containing butter (Composition 2) obtained in the above (8) was superposed upon the laminated dough containing margarine (Composition 1) obtained in the above (7) in such a manner that the former was inserted between the latter (thickness: approximately 30 mm). Next, the laminated dough was folded in four once and then rolled until the thickness became 10 mm. Then the dough was cut into pieces (100 mm in length, 10 mm in width). The obtained pieces were placed on a baking sheet in such a manner that the cross section of each piece was located upside.

(10) After baking at 200° C. for 12 minutes, a pie was obtained. This pie showed a lifting of 50 mm (the average of 10 pieces) and a layered structure comprising continuous layers and was well-baked. It had a light texture and a butter-rich flavor.

The laminated dough containing margarine of the composition 1, wherein the margarine to be exclusively used for roll-in excellent in extensibility and viscoelasticity is used, gives continuous fat layers in the pie dough and shows good puffing properties. On the other hand, the laminated dough containing butter of the composition 2 gives discontinuous fat layers and shows poor puffing properties, since the butter has a poor extensibility and a narrow range of viscoelasticity temperature and thus the hardness of the dough does not agree with that of the dough during rolling after resting.

The composite laminated dough of the present invention comprising the laminated doughs of the compositions 1 and 2 superposed upon each other can give a pie which is well baked and has a light texture and a butter-rich flavor.

Such a pie can be obtained neither by merely mixing the two above-mentioned fats nor by preliminarily blending them.

COMPARATIVE EXAMPLE 3

A pie was produced by using the composition as specified below in the following manner.

Composition

The same as the composition 2 specified in Example 3.

Production Process (1) In accordance with the above-mentioned composition, a dough consisting of 16 layers was obtained by the same procedures as the ones (1) to (6) described in Example 3.

(2) The dough was introduced into a retarder for resting therein.

(3) It was folded in four once and then into two once. After rolling until the thickness was reduced to 10 mm, it was cut into pieces (10 mm in length, 10 mm in width) and placed on a baking sheet in such a manner that the cross section of each piece was located upside.

(4) After baking at 200° C. for 12 minutes, a pie was obtained. This pie showed a lifting of 40 mm (the average of 10 pieces) and was not well-baked. It had a butter-rich flavor but a heavy texture.

EXAMPLE 4

A pie comprising the composite laminated dough of the present invention was produced with the use of the compositions as specified below in the following manner.

Composition (g)

|  | 1 | 2 |
| --- | --- | --- |
| Dough |  |  |
| hard flour | 500 | 700 |
| soft flour | 500 | 300 |

-continued

|  | 1 | 2 |
|---|---|---|
| egg (net) | 100 | 100 |
| common salt | 10 | 10 |
| shortening | 50 | 100 |
| sugar |  | 120 |
| skim milk |  | 30 |
| baker's yeast |  | 60 |
| yeast food |  | 1 |
| water | 480 | 450 |
| Fat for folding |  |  |
| margarine (to be exclusively used for roll-in) | 900 | 500 |

Production Process (1) In accordance with the composition 2, wheat flours were fed into a mixer.

(2) Cold water (at approximately 5° C.), egg, common salt, sugar, skim milk, baker's Yeast and yeast food were added to (1). The resulting mixture was mixed by stirring at a low speed for 2 minutes and then at a moderate speed for 3 minutes.

(3) After adding shortening, the mixture was mixed by stirring at a low speed for 2 minutes and at a moderate speed for 3 minutes. Kneading temperature: 20±1° C.

(4) The dough was introduced into a retarder (0-2° C.) for resting therein for approximately 3 hours.

(5) The fat was wrapped with the dough.

(6) The dough was folded in three twice to thereby give a dough consisting of 9 layers.

(7) The dough was introduced into a retarder for resting therein for approximately 3 hours.

(8) The dough was rolled until the thickness was reduced to 6 mm. Thus a laminated dough containing baker's yeast was obtained.

(9) In accordance with the composition 1, a dough con consisting of 64 layers was prepared through the same procedures as the ones (1) to (7) described in Example 1. Then the dough was rolled until the thickness was reduced to 6 mm. Thus a laminated dough free from baker's yeast was obtained.

(10) Upon the laminated dough obtained in the above (9) was superposed the laminated dough obtained in the above (8), followed by folding in three once. The laminated dough thus obtained consisted of 27 layers of the laminated dough containing baker's yeast and 192 layers of the one free from baker's yeast, namely, 219 layers in total.

(11) the composite laminated dough thus obtained was rolled until the thickness was reduced to 4 mm and then cut into rectangular pieces (120 mm in length, 100 mm in width). After placing a filling such as bean jam or sweet potato thereon, these pieces were molded into a turnover shape.

(12) After baking at 200° C. for 15 minutes, a laminated confectionery product was obtained. The obtained product showed a lifting of 35 mm (the average of 10 pieces) and was well-baked to the bottom of the filling. It had a light texture and a butter-rich and fermented flavor.

The laminated confectionery product obtained in this Example, wherein the laminated dough containing baker's yeast (Danish pastry dough) is combined with a baker's yeast-free one (pie dough), is a novel product having puffing properties of the pie dough which is never observed in conventional ones.

COMPARATIVE EXAMPLE 4

A pie was produced by using the composition as specified below in the following manner.

Composition

The same as the composition 2 specified in Example 4.

Production Process (1) In accordance with the above-mentioned composition, a laminated dough was prepared by the same procedures as the ones (1) to (8) described in Example 4. The laminated dough thus obtained was folded in three once, rolled until the thickness was reduced to 4 mm, and then cut into rectangular pieces (120 mm in length, 100 mm in width). After placing a filling such as bean jam or sweet potato thereon, these pieces were molded into a turnover shape.

(2) After baking at 200° C. for 15 minutes, a laminated confectionery product was obtained. The obtained product showed a lifting of 30 mm (the average of 10 pieces) and was not well-baked to the bottom of the filling. It had a fermented flavor and a heavy texture.

What is claimed is:

1. A composite laminated dough comprising at least two types of laminated doughs that differ substantially from each other by the presence and absence of baker's yeast, said two types of laminated doughs being superposed on each other, each of said laminated doughs being obtained by wrapping a fat in a dough mainly comprising wheat flour and by performing rolling and folding procedures.

2. A composite laminated dough comprising at least two types of wrap-in doughs superposed on each other, each of said wrap-in doughs being obtained by wrapping a fat in a dough mainly comprising wheat flour, said superposed doughs having been rolled and folded, and said at least two types of wrap-in doughs differing substantially from each other by the presence and absence of baker's yeast.

3. A composite laminated dough comprising at least two types of laminated doughs superposed on each other, each of said laminated doughs having been obtained by wrapping a fat in a dough mainly comprising wheat flour and by performing rolling and folding operations on the respective doughs prior to superposition with each other, said superposed doughs having been subjected to further rolling and folding operations, said at least two types of laminated doughs differing substantially from each other by the presence and absence of baker's yeast.

* * * * *